Oct. 7, 1947.  L. L. FOUNTAIN  2,428,563
GROUND DETECTOR FOR ELECTRIC POWER DISTRIBUTION SYSTEMS
Filed April 23, 1943
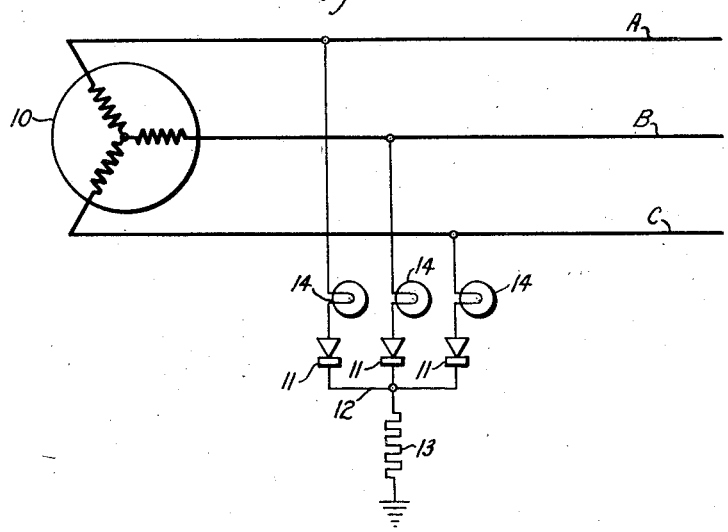
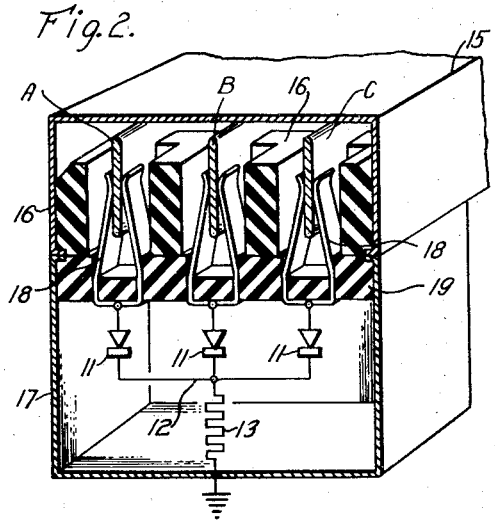
INVENTOR
Lawrence L. Fountain.

Patented Oct. 7, 1947

2,428,563

UNITED STATES PATENT OFFICE 2,428,563

GROUND DETECTOR FOR ELECTRIC POWER DISTRIBUTION SYSTEMS

Lawrence L. Fountain, Wilkinsburg, Pa., assignor to Westinghouse Electric Corporation, East Pittsburgh, Pa., a corporation of Pennsylvania Application April 23, 1943, Serial No. 484,204

5 Claims. (Cl. 177—311)

My invention relates, generally, to electric power distribution systems and, more particularly, to systems in which the power conductors are enclosed in metal ducts or raceways.

In such systems it is desirable to ground the power conductors and the enclosing duct. It has previously been proposed to ground the power conductors of such systems through resistors having relatively high amounts of resistance in the grounding circuits. However, under certain conditions the potential may still become dangerous unless the grounding resistance is so low that an excessive amount of power is drawn from the power system.

An object of my invention, generally stated, is to provide a grounding scheme for a power distribution system which shall be simple and efficient in operation and which may be economically manufactured and installed.

A more specific object of my invention is to provide a grounding scheme for a power distribution system which does not permit current to flow between the power conductors.

Another object of my invention is to provide a ground detector scheme for a power distribution system.

A further object of my invention is to provide a grounding scheme which can be used with either open or enclosed power conductors.

Other objects of my invention will be explained fully hereinafter or will be apparent to those skilled in the art.

In accordance with my invention, rectifier units are so connected between ground and the conductors of a power distribution system that current can flow only toward ground and not between phases, thereby preventing a dangerous potential from building up on the system without permitting any loss of power.

For a fuller understanding of the nature and objects of my invention, reference may be had to the following detailed description, taken in conjunction with the accompanying drawing, in which:

Figure 1 is a diagrammatic view of a power distribution system embodying my invention, and Fig. 2 is a view, in perspective, of a portion of a bus duct enclosing power conductors which are grounded in accordance with my invention.

Referring to the drawing and, particularly to Fig. 1, the power distribution system shown therein comprises a source of power 10 which may be of any suitable type and power conductors A, B and C which are connected to the power source 10, thereby constituting a three-phase power distribution system. It will be understood that branch or feeder conductors (not shown) may be connected to the main conductors A, B and C at any desirable location throughout the system.

As explained hereinbefore, it is desirable to ground the conductors, particularly when they are enclosed in a metallic housing or bus duct such as is illustrated in Fig. 2, in order to prevent a dangerous electric potential from building up on the conductors and the housing. In order that the power conductors may be grounded and at the same time prevent the draining of power from the power source, a rectifier unit 11 is provided for each one of the power conductors.

The rectifier units 11 may be of the well known copper oxide type having the property of permitting current to flow through the units in one direction only. Thus, by connecting one terminal of each of the rectifier units to one of the power conductors and connecting the other terminals to ground through a common connection 12 and a resistor 13 in the manner shown, current is allowed to flow from the power conductors to ground but is prevented from flowing between phases of the power system. In this manner a high potential is prevented from building up on the power conductors without the loss of any power from the system during normal conditions, since the rectifier units are so connected that current cannot flow from one phase conductor to another through the rectifier units.

If desired, a suitable indicating means, such as a lamp 14, may be connected in series-circuit relation with each one of the rectifier units. In the event of a ground fault on any one of the power conductors A, B or C, the lamps connected to the ungrounded conductors will light, leaving the one connected to the grounded conductor dark. Thus, for example, if the conductor C should become grounded, current would flow through the lamps 14 and the rectifier units 11 connected to the conductors A and B, through the resistor 13, the ground fault on the conductor C and thence through the power source 10 to the conductors A and B, thereby causing the lamps connected to these two conductors to light. In this manner a ground detector scheme is provided in which the lamps are normally unlighted or dark and do not take any energy. The conductor which is grounded is indicated by the lamp which remains dark during the fault condition. The resistor 13 limits the flow of the fault current in the event that any one of the power conductors becomes grounded.

As illustrated in Fig. 2, the power conductors or buses A, B and C may be enclosed in a suitable duct 15 and insulated therefrom by insulators 16. The usual provision may be made for connecting branch circuits to the buses A, B and C by means of suitable "plug in" devices which are well known in the art. The rectifier units 11 and the resistor 13 may be mounted in a housing 17 which may be similar to the "plug in" devices utilized for connecting the branch circuits to the main buses and is provided with spring clips 18 for removably connecting one terminal of each one of the rectifier units 11 to one of the power conductors A, B or C.

The spring clips 18 may be supported in the housing 17 by means of a suitable insulator 19. The housing 17 may be removably attached to the housing 15 in any suitable manner. In this manner a grounding unit may be connected to the bus duct at any point throughout the system where provision is made for connecting a branch or feeder circuit.

As explained hereinbefore, if desired, the indicating lamps 14 may be utilized as a means of indicating when a ground fault occurs on any one of the main power conductors or on a branch conductor which is connected to the power system. The lamps may be so mounted on the housing 17 that they are visible from the outside of the housing, thereby indicating when a ground fault occurs.

From the foregoing description, it is apparent that I have provided a means for adequately grounding an electrical system for the purpose of keeping its power conductors at ground potential without permitting power to be drained from the system under normal conditions. The present system is particularly suitable for use with power conductors which are enclosed in metallic housings or ducts but is not limited in its application to such systems, since it may be utilized with either an open or an enclosed system.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a multi-phase electric power distribution system, the combination with a power conductor for each phase, of a rectifier unit so connected between each power conductor and ground that current can flow through said units only toward ground, and a normally deenergized ground indicating means so connected in series circuit relation with each rectifier unit as to indicate which conductor is grounded.

2. In a multi-phase electric power distribution system, the combination with a power conductor for each phase, of a half-wave rectifier so connected between each power conductor and ground that current can flow through said rectifiers only toward ground, and a normally deenergized lamp so connected in series-circuit relation with each rectifier as to indicate which conductor is grounded.

3. In a multi-phase electric power distribution system, the combination with a power conductor for each phase, of a rectifier unit so connected between each power conductor and ground that current can flow through said units only toward ground, normally deenergized means associated with each rectifier unit for indicating which phase is grounded, and a resistor connected in series-circuit relation with the rectifier units.

4. In a three-phase electric power distribution system, the combination with a power conductor for each phase, of a half-wave rectifier so connected between each power conductor and ground that current can flow through said rectifiers only toward ground, normally deenergized means controlled by each rectifier to indicate which phase is grounded, and a resistor connected between said rectifiers and ground.

5. In a three-phase electric power distribution system, the combination with a power conductor for each phase, of a rectifier unit so connected between each power conductor and ground that current can flow through said units only toward ground, a normally deenergized lamp connected in the circuit for each rectifier unit to indicate which phase is grounded, a common connection for one terminal of said rectifier units, and a resistor connected between said common connection and ground.

LAWRENCE L. FOUNTAIN.

REFERENCES CITED

The following references are of record in the file of this patent:

UNITED STATES PATENTS

| Number | Name | Date |
| --- | --- | --- |
| 1,115,174 | Creighton | Oct. 27, 1914 |
| 2,148,136 | Samar | Feb. 21, 1939 |
| 1,822,742 | McEachron | Sept. 8, 1931 |
| 1,554,704 | Biermanns | Aug. 22, 1925 |
| 2,022,758 | Corderman | Dec. 3, 1935 |
| 396,582 | Loomis | Jan. 22, 1889 |
| 1,794,686 | Heinisch et al. | Mar. 3, 1931 |